(12) United States Patent
Kidd et al.

(10) Patent No.: US 6,182,267 B1
(45) Date of Patent: Jan. 30, 2001

(54) ENSURING ACCURATE DATA CHECKSUM

(75) Inventors: Jeffrey W. Kidd, Hillsborough; William E. Jennings, Cary, both of NC (US)

(73) Assignee: Cisco Technology, Inc., San Jose, CA (US)

(*) Notice: Under 35 U.S.C. 154(b), the term of this patent shall be extended for 0 days.

(21) Appl. No.: 09/197,225

(22) Filed: Nov. 20, 1998

(51) Int. Cl.[7] .............. G06F 11/10; G06F 11/30
(52) U.S. Cl. .............. 714/807; 714/746; 714/52
(58) Field of Search .................. 714/807, 805, 714/819, 746, 52

(56) References Cited

U.S. PATENT DOCUMENTS

| | | | |
|---|---|---|---|
| 4,482,999 | 11/1984 | Janson et al. | 370/452 |
| 4,549,291 | 10/1985 | Renoulin et al. | 370/452 |
| 5,014,265 | 5/1991 | Hahne et al. | 370/236 |
| 5,072,449 | 12/1991 | Enns et al. | 714/776 |
| 5,128,945 | 7/1992 | Enns et al. | 714/776 |
| 5,260,936 | 11/1993 | Bardet et al. | 370/428 |
| 5,280,470 | 1/1994 | Buhrke et al. | 370/232 |
| 5,341,478 | 8/1994 | Travis, Jr. et al. | 711/146 |
| 5,386,512 | 1/1995 | Crisman et al. | 709/228 |
| 5,430,842 | 7/1995 | Thompson et al. | 709/236 |
| 5,491,802 | 2/1996 | Thompson et al. | 709/236 |
| 5,546,549 | 8/1996 | Barrett et al. | 710/129 |
| 5,555,374 | 9/1996 | Armerding et al. | 710/2 |
| 5,621,894 | 4/1997 | Menezes et al. | 709/227 |
| 5,632,021 | 5/1997 | Jennings et al. | 710/129 |
| 5,636,371 | 6/1997 | Yu | 703/26 |
| 5,663,952 | 9/1997 | Gentry, Jr. | 370/252 |
| 5,673,279 | * 9/1997 | Oskouy et al. | 714/819 |
| 5,699,532 | 12/1997 | Barrett et al. | 710/129 |
| 5,708,654 | 1/1998 | Arndt et al. | 370/242 |
| 5,764,887 | 6/1998 | Kells et al. | 713/200 |
| 5,928,372 | * 7/1999 | Yoshida | 714/704 |
| 5,935,268 | * 8/1999 | Weaver | 714/758 |
| 5,964,831 | 10/1999 | Kearns et al. | 709/201 |
| 6,061,822 | * 5/2000 | Meyer | 714/758 |

FOREIGN PATENT DOCUMENTS 2283645  10/1995  (GB).

OTHER PUBLICATIONS

AIX Version 3.2, "Enterprise Systems Connection Adapter: User's Guide and Service Information," IBM, 1993, pp. 6.1–6.16.

"Chapter 2 Signal Definition," PCI Local Bus, pp. 7–48.

"GT–64011 PCI System Controller for R4640 Processors," Galileo, pp. 29–34.

* cited by examiner

*Primary Examiner*—Albert De Cady
*Assistant Examiner*—Shelly A Chase
(74) *Attorney, Agent, or Firm*—Cesari and McKenna, LLP

(57) ABSTRACT

A system and method are provided that permit an accurate checksum to be generated of a block of data being transmitted via a prefetched bus, despite repeated transmissions of identical portions of the block and presentation of those identical to checksum logic simultaneously with their transmission by the bus, by ensuring that only those portions of the data block that have yet to be checksummed are checksummed.

9 Claims, 14 Drawing Sheets

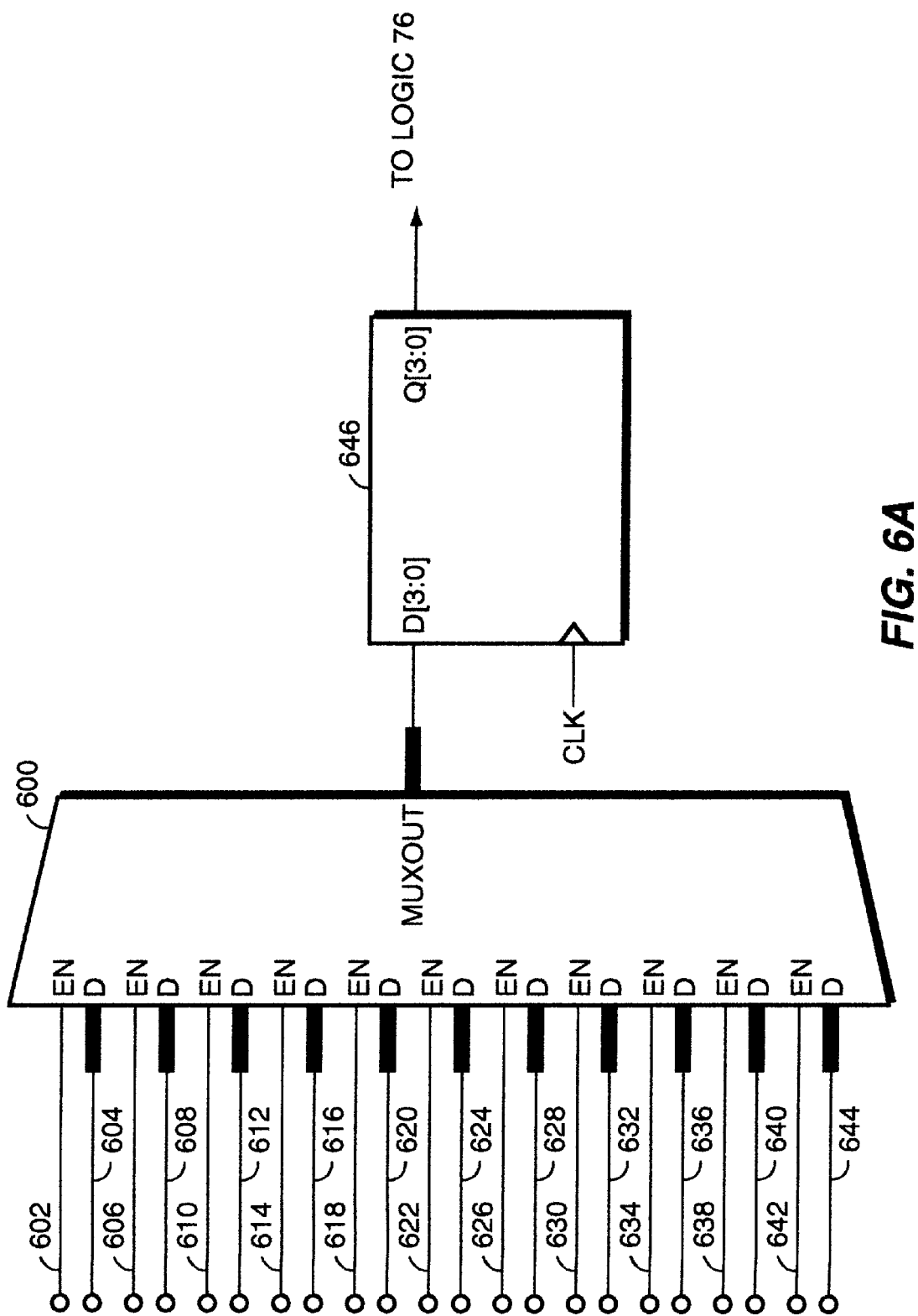

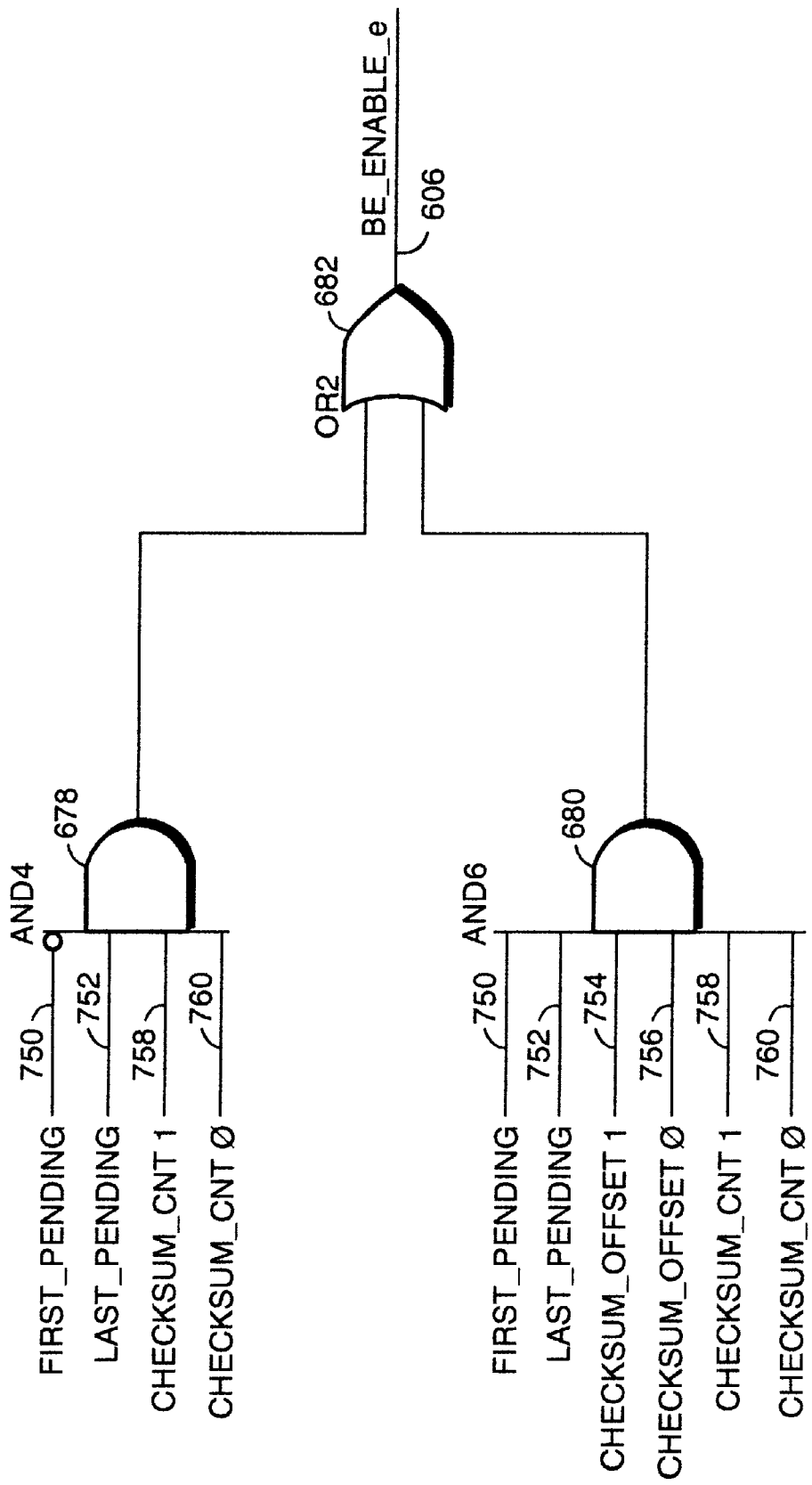

ENSURING ACCURATE DATA CHECKSUM

CROSS-REFERENCE TO RELATED APPLICATIONS

This application is related to the following applications: U.S. patent application Ser. No. 08/920,714, filed Aug. 29, 1997, entitled "Option Request Protocol"; U.S. patent application Ser. No. 08/921,158, filed Aug. 29, 1997, entitled "IP Checksum Off-Load"; and U.S. patent application Ser. No. 09/149,719, filed Sep. 8, 1998, entitled "Enhanced CLAW Packing Protocol". Each of these applications is assigned to the Assignee of the subject application and is incorporated herein by reference in its entirety. An additional related application is U.S. patent application Ser. No. 08/920,713, filed Aug. 29, 1997, entitled "Method and Apparatus for Dynamic Link Name Negotiation".

BACKGROUND OF THE INVENTION

1. Field of the Invention

The present invention relates generally to a system and method for use in detecting errors in data transmission, and more specifically, to a system and method for ensuring accurate checksumming of data transferred via at least one pre-fetchable bus.

2. Brief Description of Related Prior Art

In modern computer systems, data is transferred among various processing/communications modules of the system. Errors may be introduced during transmission of the data. Consequently, error control has become an integral part of the design of such computer systems.

In order for the system to be able to control data transmission errors, it must be able to accurately determine when such errors occur. A checksum procedure is one conventional technique for determining when errors have been introduced into a data stream (e.g., a data block or packet). In a typical checksum procedure, a numerical value ("checksum" or "checksum value") is generated by the sender ("the sender's checksum") of the packet in the system by applying a computational algorithm (e.g., a parity or cyclic redundancy check, hashing function, summation of the number of bits in the packet equal to "1", summation of the numerical values represented by the data, etc.) to the contents of packet. This value is then sent with the packet when the packet is transmitted. After the recipient receives the packet, the recipient computes a new checksum value ("the recipient's checksum") by applying the same algorithm to the received data packet, and compares the recipient's checksum to that transmitted with the data packet. If the two checksums match, it is assumed that transmission of the packet was successful (i.e., no errors were introduced into the packet during transmission). Alternatively, if the two values do not match, it is assumed that errors where introduced into the packet during its transmission, and the recipient typically undertakes action (e.g., requesting that the packet be re-transmitted by the sender) to remedy the situation.

In order to speed data transfer and reduce software processing overhead in the system, it is often desirable to calculate the sender's checksum using a checksum system that is substantially or entirely hardware, and wherein, as portions of the data block to checksummed are transmitted to the recipient, they are substantially simultaneously presented to the checksum logic, in parallel with their transmission to the recipient. Each time a portion of the data block is presented to the checksum logic, the checksum logic generates a new subtotal checksum by essentially accumulating checksums of the data block portion being presented (using a predetermined checksum algorithm implemented by the checksum logic) and a subtotal checksum of those portions of the data block previously presented to the checksum logic. Once the final portion of the data block has been presented to the checksum logic, the resulting total accumulated checksum of the data block is generated, and transmitted to the recipient, which then uses this total checksum to determine whether the transmission of the data block was successful.

Unfortunately, problems can arise in accurately calculating the sender's checksum using the above-described technique, if the data block is transmitted from the sender to the recipient via a pre-fetched bus system. As used herein, a bus system is said to be "pre-fetched" if data latency may exist between different portions of the bus. Such data latency may arise, e.g., if the bus (1) comprises one or more bus controllers (or other data buffering devices) through which data transmitted via the bus from the source must pass before it can reach the recipient, and/or (2) the bus permits the recipient to command that data be transmitted from the source to the recipient via a "burst mode" data transfer operation (e.g., via direct memory accessing (DMA) of the data source wherein the source is commanded to transmit data to the recipient, starting with portions of the data associated with a memory location specified in the DMA command, and continuing during subsequent bus read cycles, with portions of the block associated with subsequent sequential memory locations, until assertion of the transfer command terminates, and without specification in the command of the total amount of data that is to be provided to the recipient from the source in the transfer operation). One example of a prefetched bus, as that term is used herein, is a conventional Peripheral Component Interconnect ("PCI") bus.

As a result of the data latency that may exist in a pre-fetched bus system wherein data checksummed in parallel with its transmission to the recipient, if the total length of the data packet exceeds the maximum data word length that can be transferred via the bus in a single bus data transfer operation cycle (i.e., the "bus width") and the transfer operation is terminated prior to receipt of all of the portions of the data block transmitted by the source, portions of the data block to be checksummed may be transmitted from the source via the bus, but not received by the recipient. Thus, in this type of system, repeated transmission of identical portions of the data block may be required in order for the recipient to receive the entire data block.

Unfortunately, since in this type of system the data is checksummed by the source's checksum logic in parallel with its transmission to the recipient, portions of the data block that undergo repeated transmission to the recipient also undergo repeated checksumming by the checksum logic. This causes the data block's total checksum as generated by the checksum logic to be invalid, and likely results in unnecessary retransmission of the entire data block from the source to the recipient.

Partial solutions to these problems may involve (1) clearing and recalculating of the checksum logic's subtotals after repeated transfers of the same data from the source, or (2) calculating the checksum of the entire data block in a separate checksum operation prior to transmitting any of the data block to the recipient. Disadvantageously, these partial solutions decrease overall data transfer speed, and increase data processing overhead.

SUMMARY OF THE INVENTION

In accordance with the present invention, a system and method are provided that overcome the aforesaid and other disadvantages and drawbacks of the prior art. More specifically, the system and method of the present invention ensures that an accurate total checksum is generated of a data block being transmitted via a prefetched bus, by ensuring that only portions of the data block that have yet to undergo checksumming are checksummed by checksum logic, in parallel with their transmission via the bus, despite repeated transmissions of identical portions of the data block.

Advantageously, the present invention permits only those portions of the data block that have not yet been previously checksummed by the checksumming logic to be so checksummed, despite repeated transfers of the same portions of data from the data source. Advantageously, this ensures that an accurate total checksum of the entire data block is generated, despite repeated reads of identical memory locations in the block, and without requiring either the clearing of the checksum logic and restoring of the block's previously calculated partial checksum after such repeated reads, or a separate checksum calculation operation (i.e., wherein the checksum of the entire block would be calculated prior to being transferred to the recipient). Thus, the present invention is able to generate an accurate total checksum of a data packet being transferred via a prefetchable bus, without decreasing data transfer speed or substantially increasing data processing overhead.

These and other features and advantages of the present invention will become apparent as the following Detailed Description proceeds, and upon reference to the Drawings, wherein like numerals depict like parts, and in which:

Figure 1:
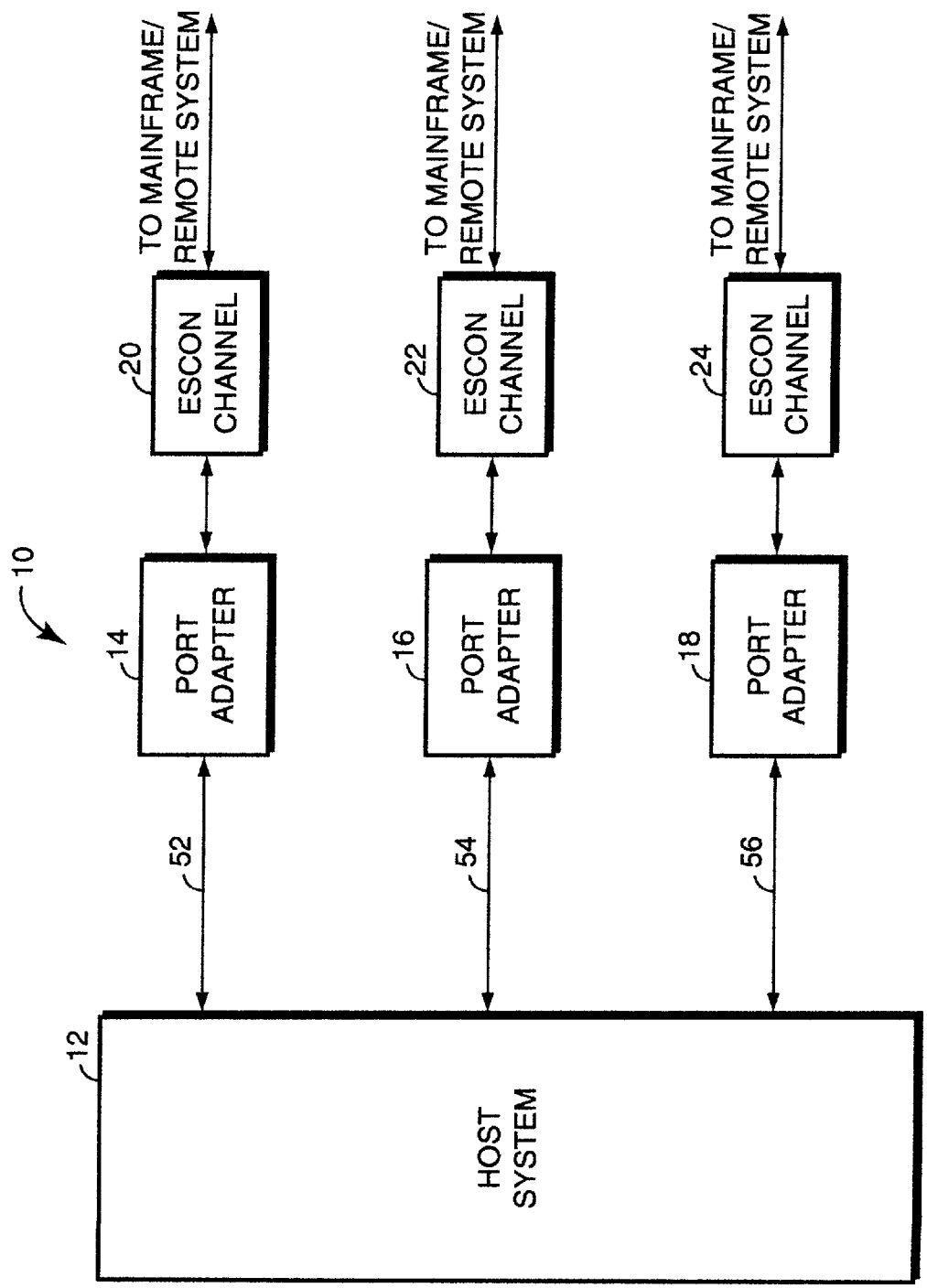
FIG. 1 is a highly schematic functional block diagram of computer network system which utilizes one embodiment of the present invention.
Figure 2:
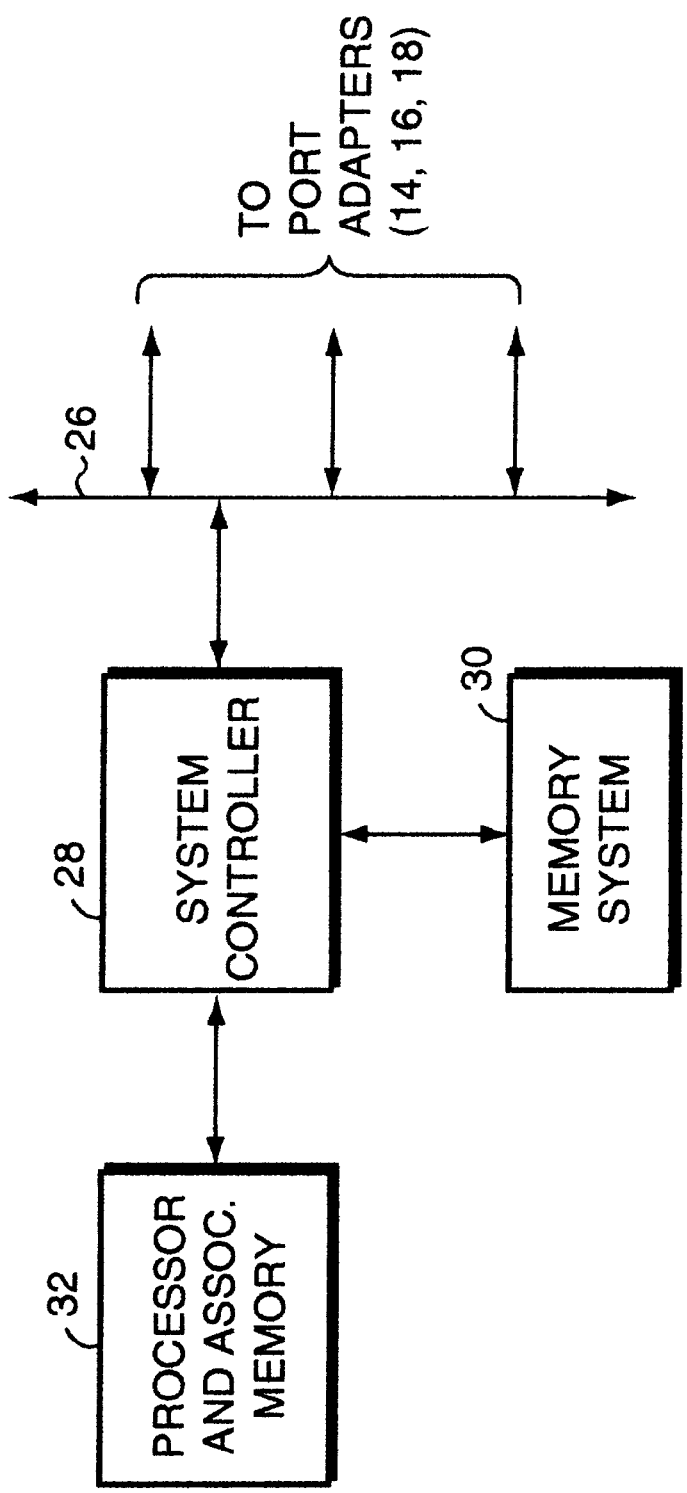
FIG. 2 is a highly schematic functional block diagram illustrating construction of relevant portions of the router shown in FIG. 1.

As will be appreciated by those skilled in the art, although the following Detailed Description will proceed with reference being made to specific embodiments and methods of use, the present invention is not intended to be limited to these embodiment and methods of use. Rather, the present invention is intended to be viewed broadly as encompassing all alternatives, modifications, and variations from these embodiments and methods of use as are included within the spirit and broad scope of the hereinafter appended claims.

DETAILED DESCRIPTION OF AN ILLUSTRATIVE EMBODIMENT

Turning now to the Figures, one preferred embodiment of the present invention will be described in connection with use in a network computer system 10. System 10 includes a host computer router system 12 coupled to a plurality of host system/channel port adapters 14, 16, 18, which provide input/output ports to connect the host system 12 to respective conventional IBM Enterprise System Connection (ESCON) serial communications channels 20, 22, 24 to one or more respective remote mainframe computer systems (not shown). As will be described in greater detail below, each of the mainframe computers can communicate with the router 12, other mainframes, and/or network devices (not shown) external to system 10 by causing the I/O subsystem associated with the mainframe's ESCON channel to transmit data packets (containing e.g., appropriate routing information) from the mainframe to the host computer 12 via the respective ESCON channel and port adapter associated with the mainframe from which the packets are transmitted. The router 12 is adapted to receive the data packets and forward the packets to appropriate destination stations (not shown) via the router's ports (not shown), based upon the packets' respective routing information and the router's routing tables stored in the router's memory.

Router 12 comprises an internal bus (e.g., a PCI-based bus) 26 to which each of the adapters 14, 16, 18 is respectively connected. Bus 26 is also connected to a system controller 28, which in turn, is connected to the router's central processor and associated memory 32, and router memory system 30.

Figure 3:
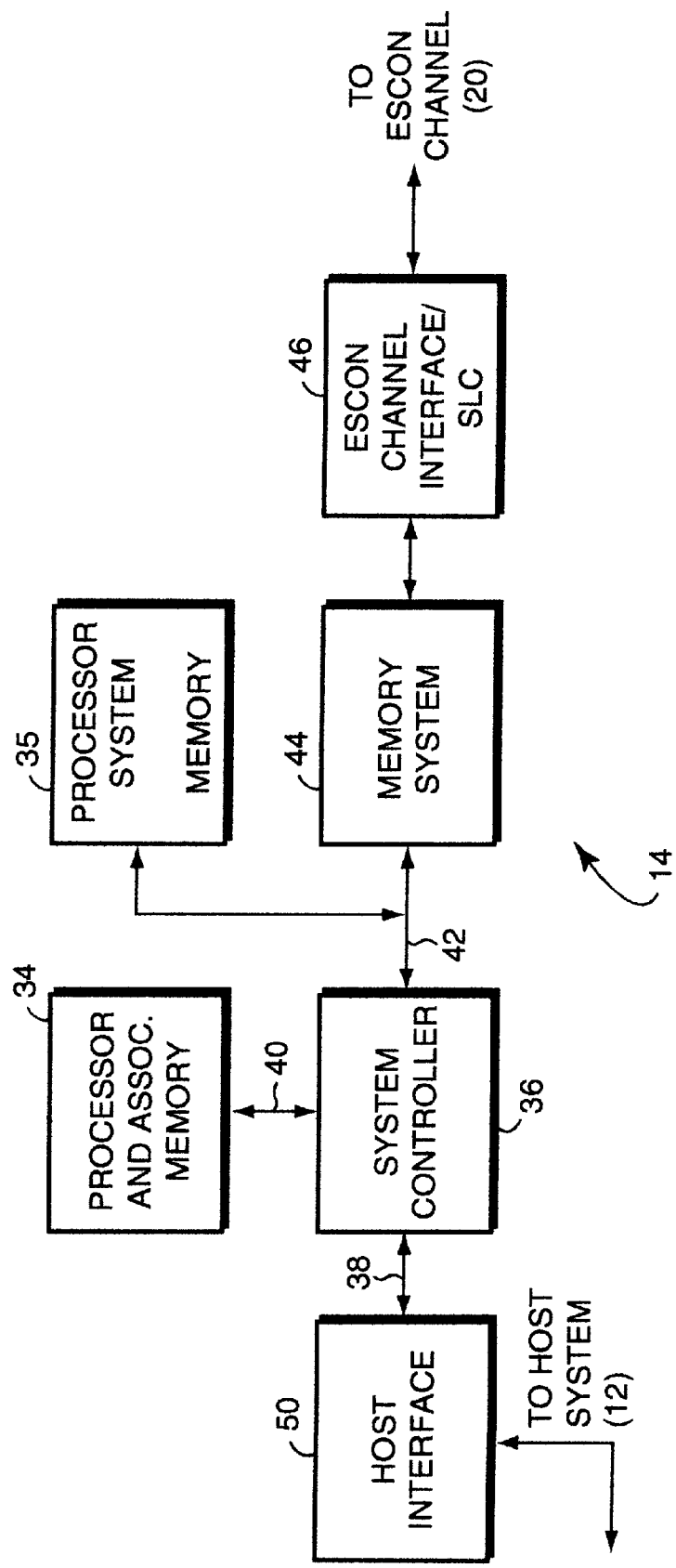
FIG. 3 is a highly schematic functional block diagram illustrating construction of a port adapter system of the network system shown in FIG. 1.
Figure 4:
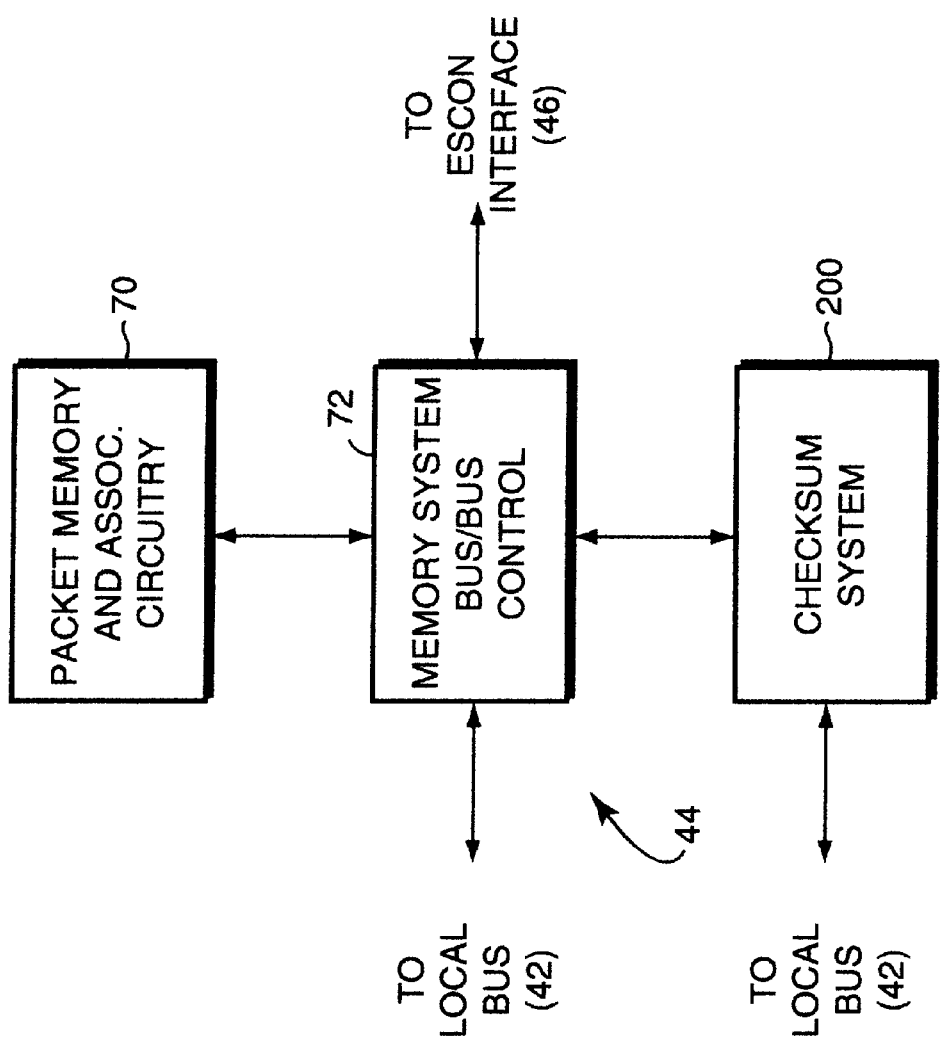
FIG. 4 is a highly schematic functional block diagram illustrating construction of the memory system of the port adapter system of FIG. 3.

FIG. 3 is a high-level functional block diagram of channel port adapter 14. It should be understood that although for purposes of brevity only the function and operation of adapter 14 will be described in detail herein, each of the other two port adapters 16, 18 is functionally and operationally identical to adapter 14, except that adapters 16, 18 are connected to channels 22, 24, respectively. Adapter 14 includes a host interface 50 which is connected both to the host bus 26 via connection 52, and to host interface bus 38. Bus 38 preferably comprises a PCI bus and connects the port adapter system controller 36 (which, e.g., comprises a commercially available Galileo Technology, Inc. GT 64011 PCI system controller) to host interface (e.g., comprising a bridging system for ameliorating electrical loading problems that might occur in absence of same) 50. A central processor system bus 40 connects the port adapter's central processor (e.g., a commercially available Integrated Device Technology, Inc. IDT79RV4640-100 MU RISC processor) and associated cache, SRAM, etc. memory 34 to the controller 36. Local port adapter bus 42 connects the controller 36 to the port adapter packet memory system 44 and processor's system memory 34 (e.g., comprising 4 megabytes of EDO DRAM for storing operating code and exception vectors for the processor 34), and is capable of burst mode data transfer operations. ESCON channel interface logic 46 provides physical and low level logical functions, and a serial link controller (SLC) for appropriately processing/controlling data flow between the memory system 44 and the ESCON channel 20. The interface logic 46 may comprise conventional IBM Enabler Technologies' ESCON integrated circuits.

Memory system 44 comprises a memory system bus and associated circuitry 72 for connecting packet memory and associated circuitry 70 to the ESCON interface logic 46, and to the local bus 42. Packet memory and associated circuitry 70 preferably comprises 32 megabytes of EDO DRAM having 32 bits of data width and byte parity, thereby resulting in a total memory width of 36 bits, and control/memory refresh logic provided in the form of a field programmable gate array (FPGA) or other complex programmable logic device (CPLD) for use with the DRAM for DRAM address multiplexing and controlling direct memory access (DMA) writes/reads, and refreshes, etc. of data to and in the DRAM. The memory system bus and associated circuitry 72 preferably comprises a non-multiplexed 32 bit address/36 bit data bus with burst transfer capabilities based upon the Intel i960CA bus architecture and bus controller/arbitrator logic for controlling mastery of the bus. The bus controller/arbitrator logic of element 72 and the data checksum system 200 preferably are embodied in a single CPLD.

In adapter 14, the memory bus controller/arbitrator logic of element 72 controls whether the SLC or the system controller 36 is the "master" of the memory bus. The memory 70 is the "slave" device for whichever of these two components is currently the master of the memory bus.

When a data packet is to be written to the memory 70 from the ESCON channel 20, the SLC 46 obtains mastery of the memory bus by issuing bus control requests to the memory bus controller/arbitrator logic, which logic, if the system controller 36 is not currently the master of the bus, grants such mastery to the SLC 46. Once granted mastery of the memory bus, the SLC 46 transfers the data packet from the ESCON channel 20 to the memory 70, using DMA techniques, such that the entire packet is located in a contiguous block in memory 70. The byte length of the packet typically exceeds the respective bus widths of the buses 26, 38, 42; each of these bus widths may be identical. The SLC 46 also transmits to the processor 34 (via the memory bus, local bus 42, controller 36, and bus 40), the starting location, block length, and initial offset (i.e., size of the first portion to be transferred router 12) of the packet in the memory 70.

In this embodiment of the present invention, each of the adapters 14, 16, 18 may implement IP checksum offload techniques described in the aforesaid copending applications. Thus, at least certain packets received by the port adapters from the mainframe systems may not comprise respective packet checksums, and the port adapters receiving such packets may instead generate the packets' respective checksums.

In each port adapter, the data to be checksummed by the checksum logic 72 does not pass serially through the checksum logic 76 prior to being placed on the memory system bus. Rather, if the SLC 46 is the master of the memory bus, data/control signals from the SLC 46 may pass through the memory bus to the controller 36 and vice versa, without having to pass through the checksum logic 76. The system 200 generates the checksum of the entire packet in memory 70, in parallel with transmission of the packet from memory 70 to the router 12. As will be described in greater detail below, the system 200 makes these calculations based upon control signals and values generated and supplied by the processor 34 based upon the starting location, block length, and initial offset (i.e., size of the first portion to be transferred) of the packet in the memory 70.

Figure 5:
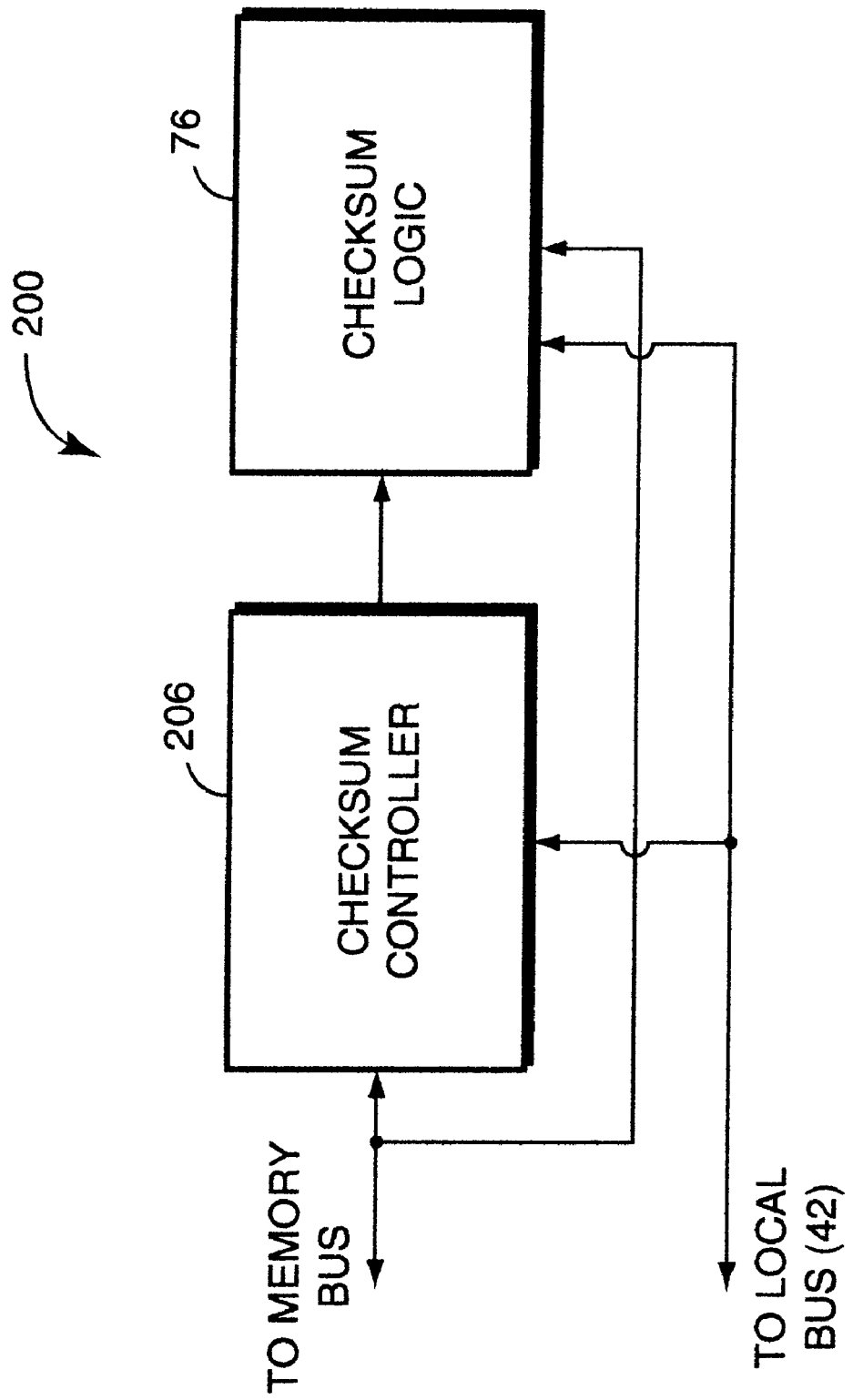
FIG. 5 is a highly schematic functional block diagram of the checksum system used in the port adapter of FIG. 3.

More specifically, as shown in FIG. 5, the checksum generator 200 comprises both (1) checksum logic 76 for actually generating checksums of data presented thereto, and (2) a checksum controller 206 for controlling which data is checksummed by the checksum logic. It should be understood that although the checksum generator 200 is described as being used solely in connection with operations for transferring data from the memory 70 (i.e., data read operations of the memory 70), if appropriately modified, port adapter 14 may include two such checksum generators, one generator 200 as described herein for use in connection with data read operations of the memory 70, and another checksum generator (not shown) that is for use in connection with operations for transferring data to the memory 70 (i.e., data write operations for writing data received from the ESCON channel or from the router to the memory 70).

Figure 6B:
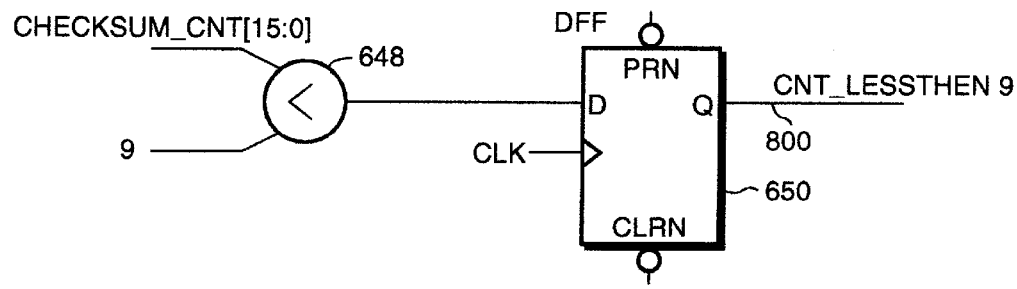
FIGS. 6A–6O are highly schematic functional block diagrams of the logic used to control checksumming of data by the checksum logic shown in FIG. 5.
Figure 6C:
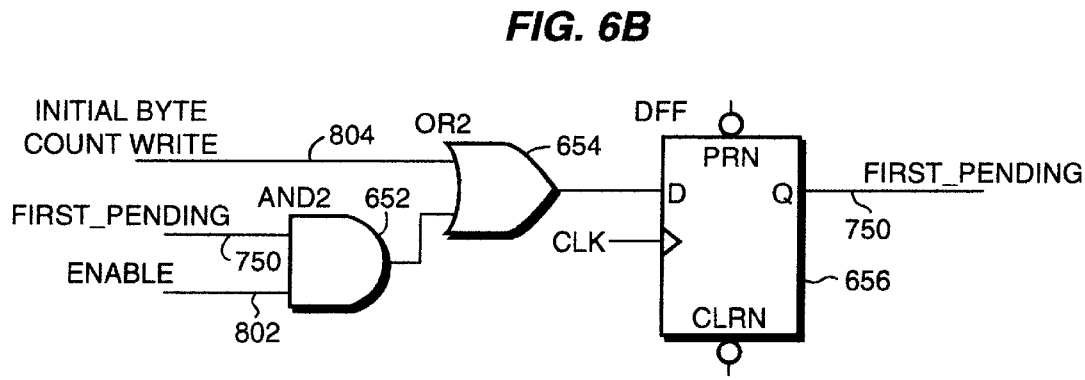
Figure 6D:
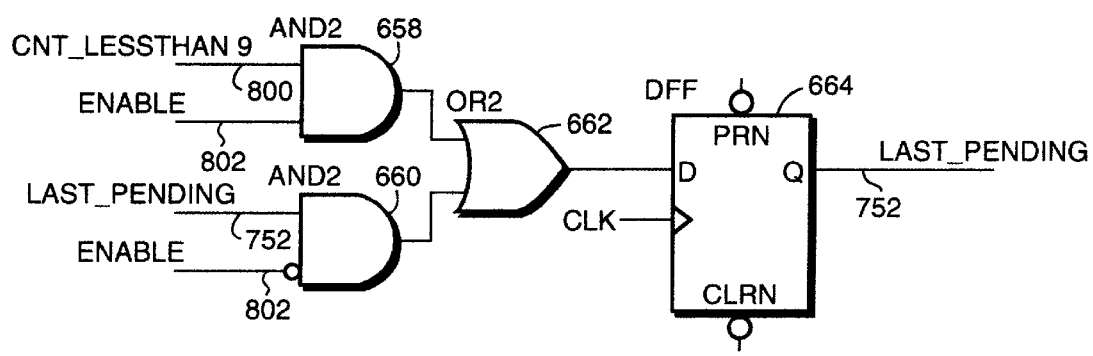
Figure 6E:
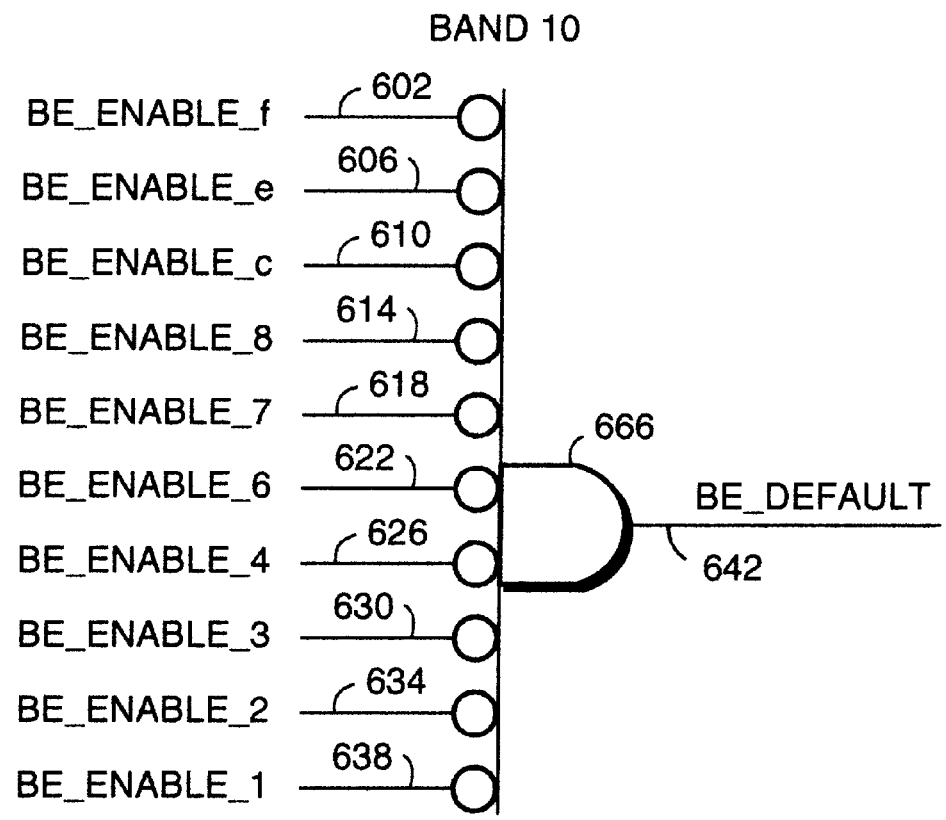
Figure 6F:
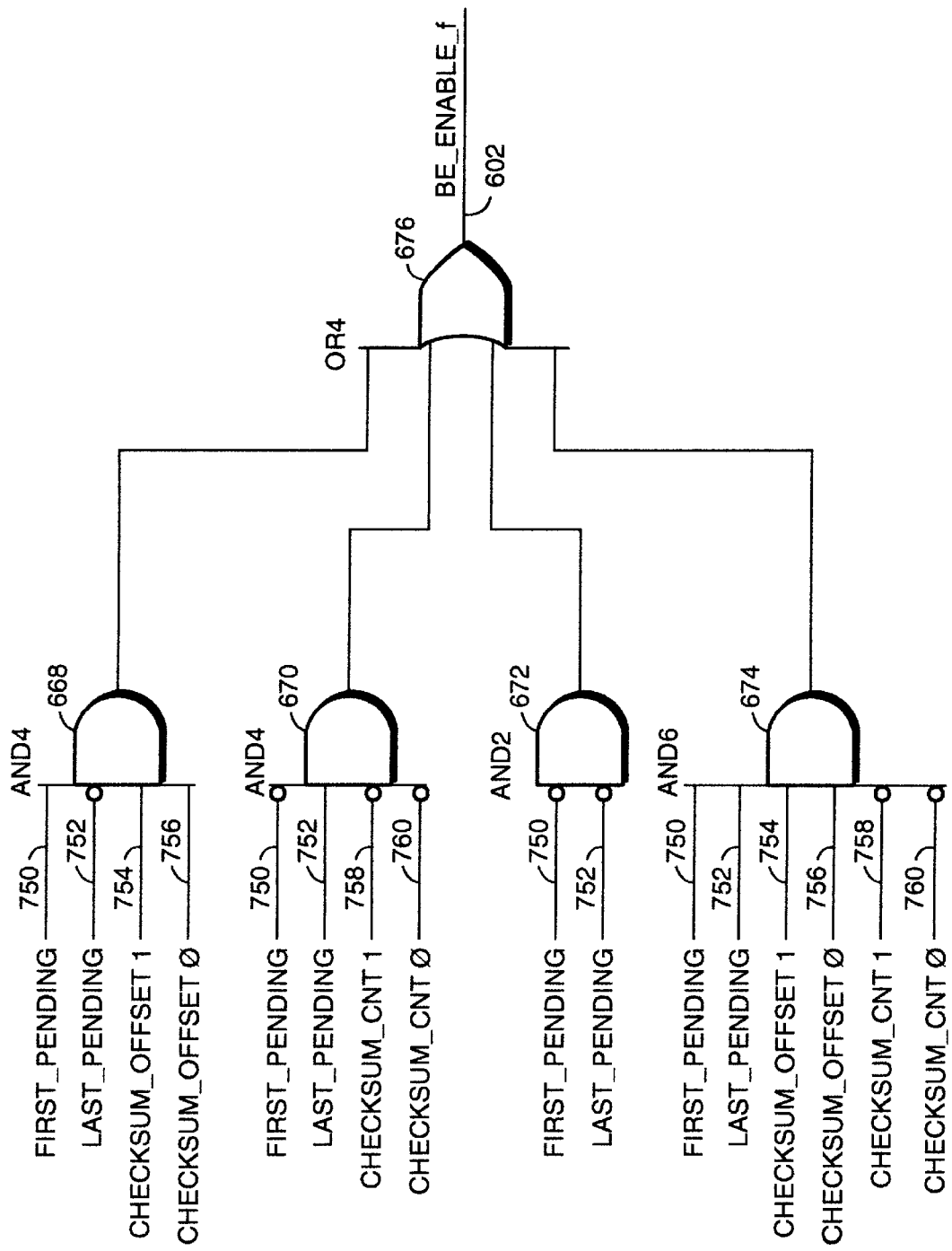
Figure 6H:
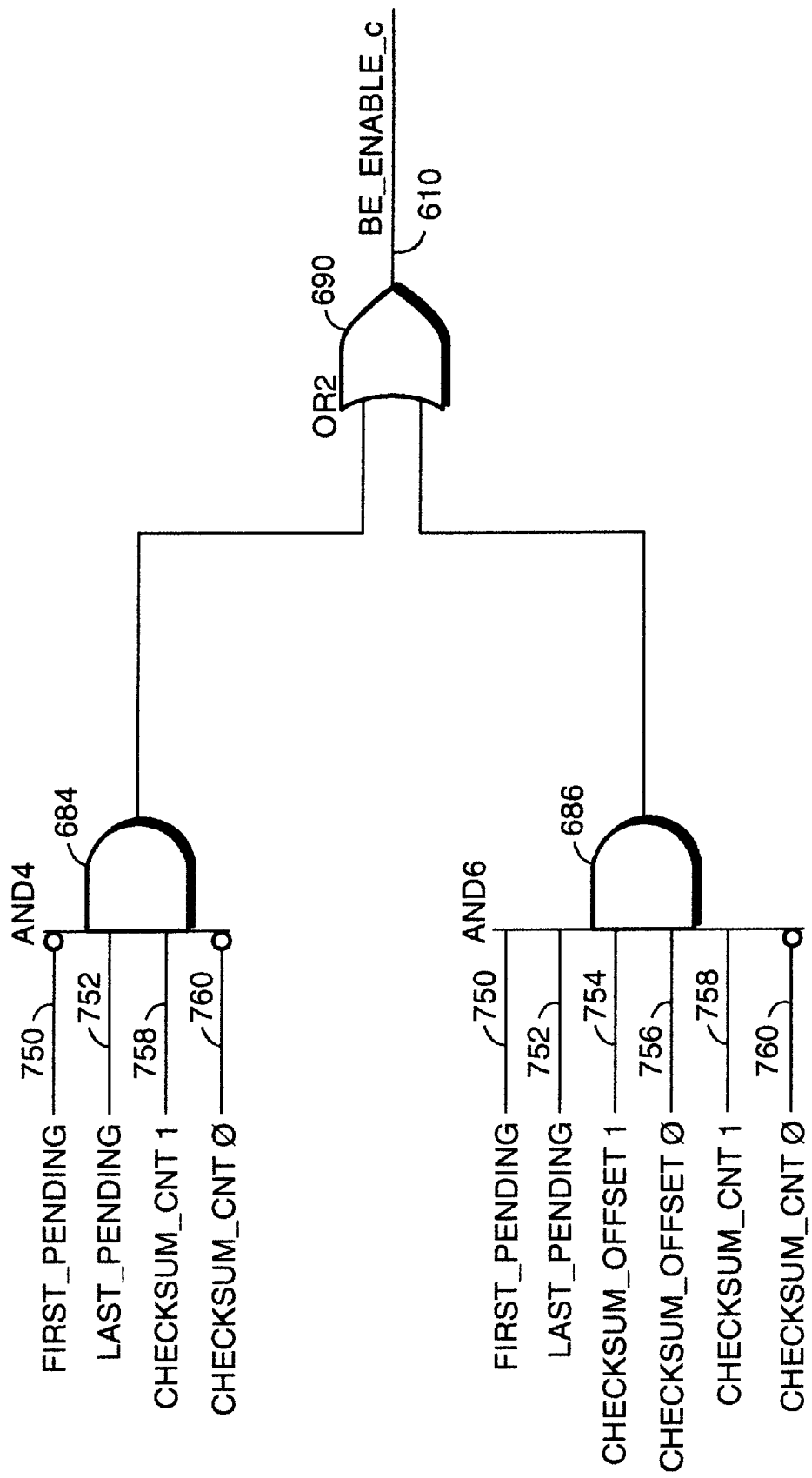
Figure 6O:
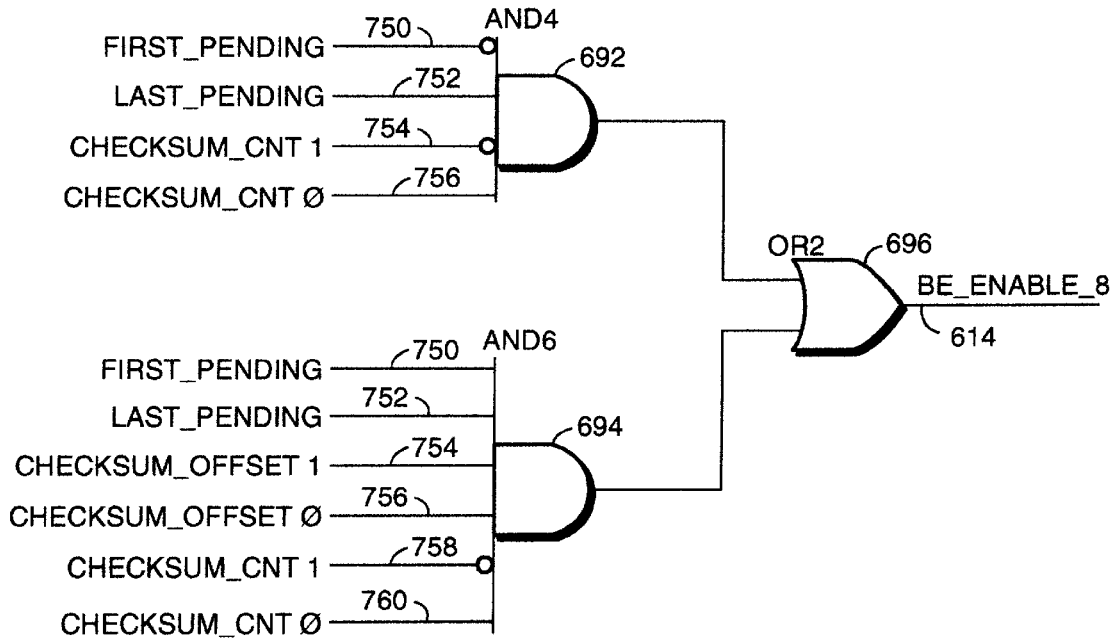
Figure 6I:
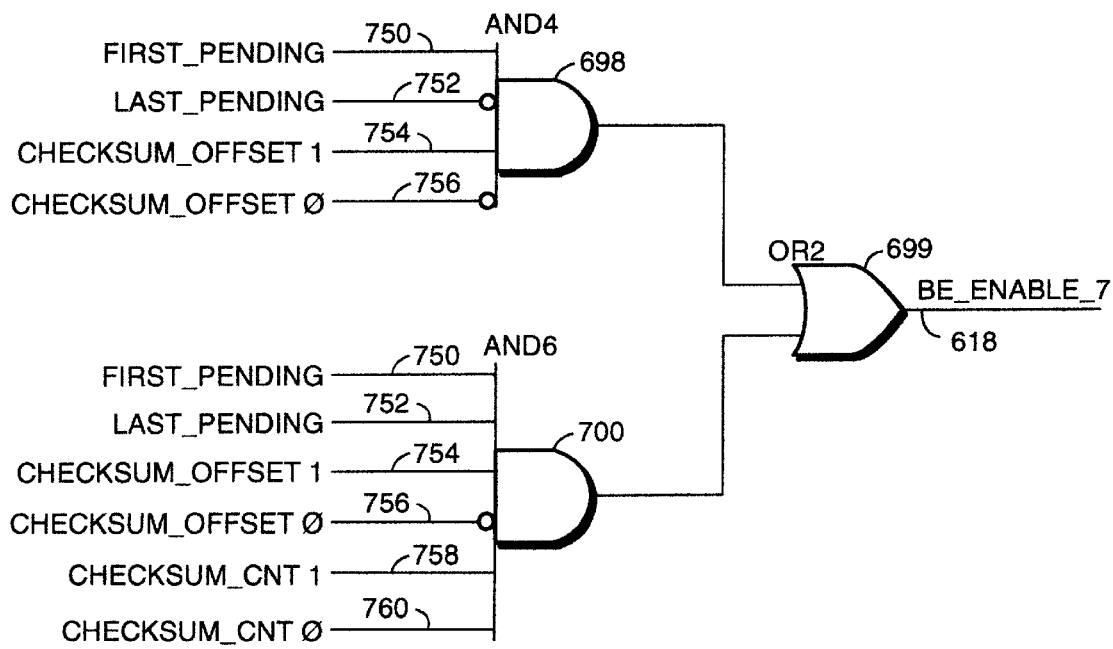
Figure 6N:
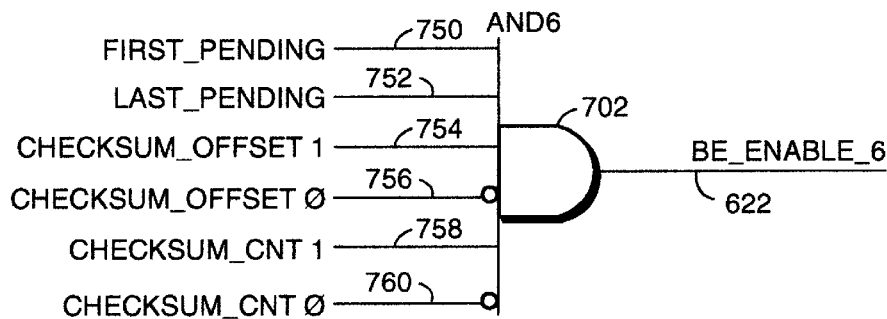
Figure 6M:
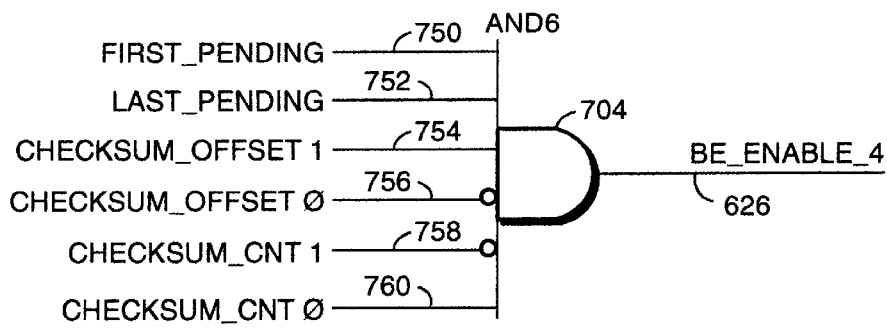
Figure 6J:
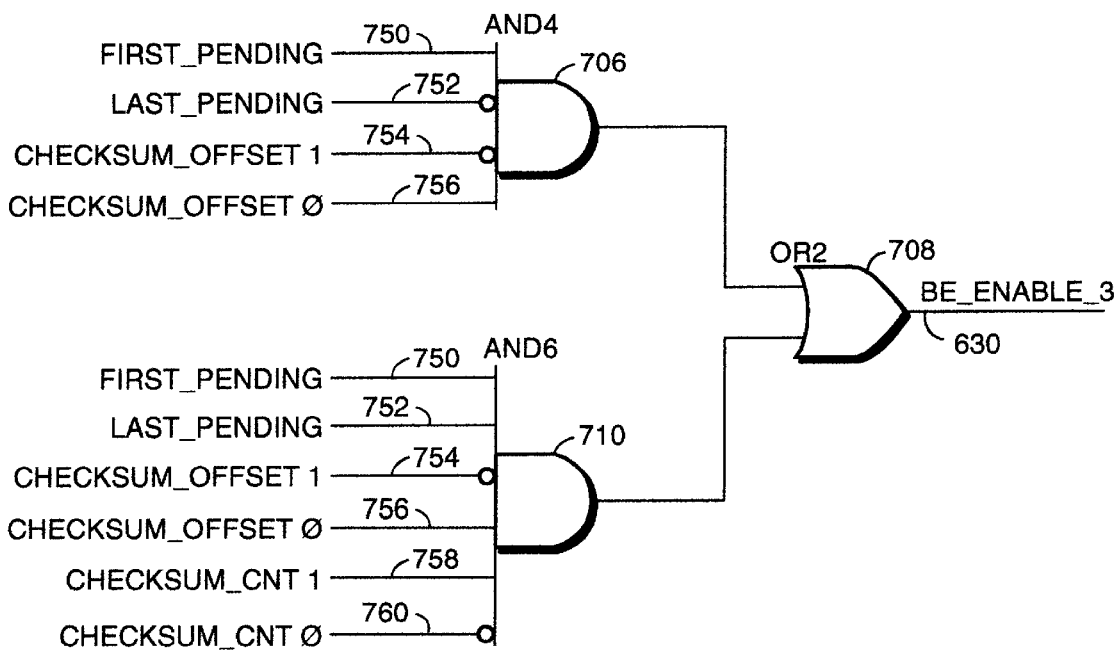
Figure 6L:
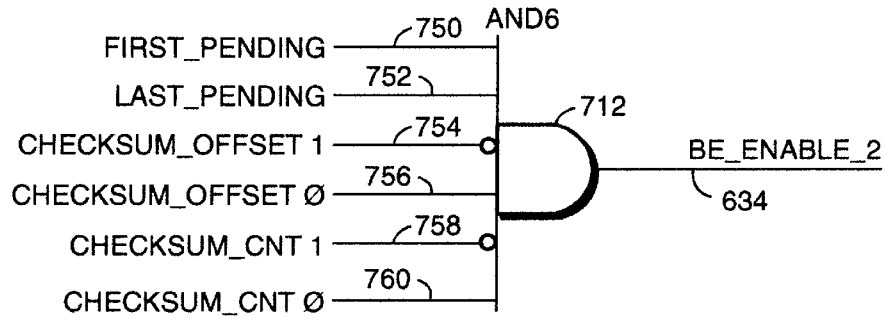
Figure 6K:
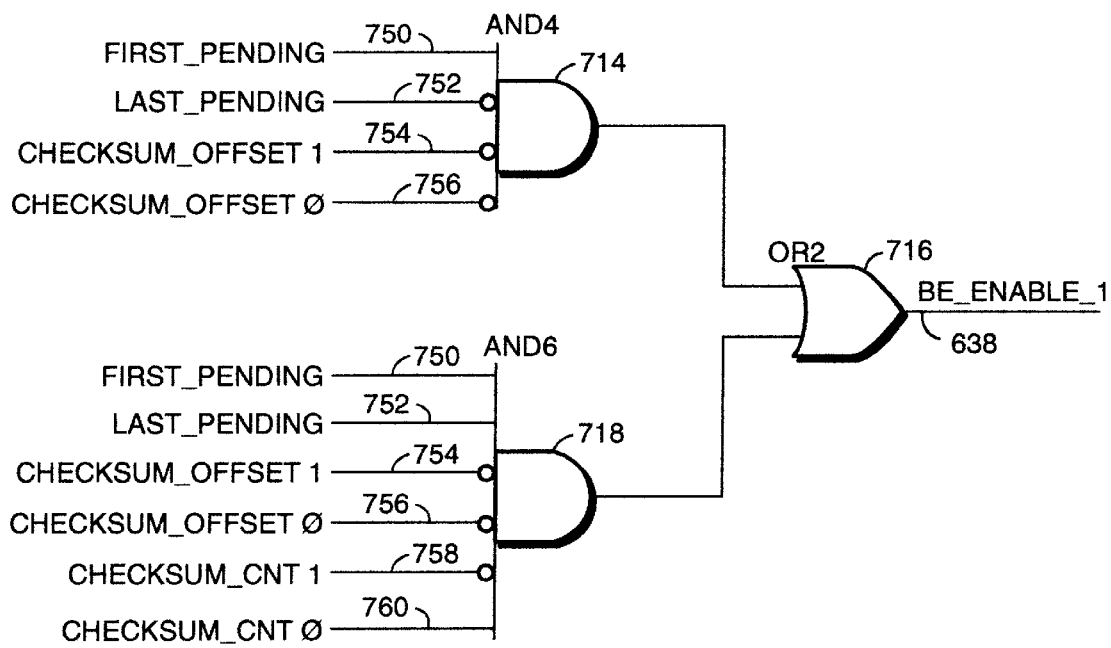

Turning now to FIGS. 6A–6O, logic used to control checksumming by checksum logic 76 will be described. More specifically, FIGS. 6A and 6E to 6O illustrate the logic of the checksum controller 206, while FIGS. 6B to 6D illustrate checksum control logic implemented by processor 34. Controller 206 comprises multiplexer logic 600 which generates a four-bit output signal based upon which of the lines 602, 606, 610, 614, 618, 622, 626, 630, 634, 638, 642 is propagating a high logic state signal. The logic of controller 206 is configured such that only one of the signals being propagated via lines 602, 606, 610, 614, 618, 622, 626, 630, 634, 638, 642 can be in high logic state any given time. When the signal on line 602 is in high logic state, the signal on line 604 is selected by logic 600 for output to flip-flop 646. When the signal on line 606 is in high logic state, the signal on line 608 is selected by logic 600 for output to flip-flop 646. When the signal on line 610 is in high logic state, the signal on line 612 is selected by logic 600 for output to flip-flop 646. When the signal on line 614 is in high logic state, the signal on line 616 is selected by logic 600 for output to flip-flop 646. When the signal on line 618 is in high logic state, the signal on line 620 is selected by logic 600 for output to flip-flop 646. When the signal on line 622 is in high logic state, the signal on line 624 is selected by logic 600 for output to flip-flop 646. When the signal on line 626 is in high logic state, the signal on line 628 is selected by logic 600 for output to flip-flop 646. When the signal on line 630 is in high logic state, the signal on line 632 is selected by logic 600 for output to flip-flop 646. When the signal on line 634 is in high logic state, the signal on line 636 is selected by logic 600 for output to flip-flop 646. When the signal on line 638 is in high logic state, the signal on line 640 is selected by logic 600 for output to flip-flop 646. When the signal on line 642 is in high logic state, the signal on line 644 is selected by logic 600 for output to flip-flop 646. The signals on lines 604, 608, 612, 616, 620, 624, 628, 632, 636, 640, 644 are respective four-bit signals, and respectively, are equal to 1111, 1110, 1100, 1000, 0111, 0110, 0100, 0011, 0010, 0001, and 1111, where "1" represents a high logic state and "0" represents a low logic state.

The signal on line 602 is generated as the result of a logical OR operation, executed by OR logic 676, of the outputs of AND gates 668, 670, 672, 674. The output of gate 668 is generated as the result of a logical AND operation of a "first_pending" signal on line 750, the logical inversion of a "last_pending" signal on line 752, "checksum_offset1" signal on line 754, and "checksum_offset0" signal on line 756. The signals on lines 750, 752, 754, and 756 are generated by the processor 34 based upon the starting location, block length, and initial offset of the packet in memory 70 to be transferred to the router 12. The signal on line 750 is in a high logic state when the data transfer of the packet is first initialized, and enters a low logic state after transfer of the first word of the packet from memory 70. The signal on line 752 enters high logic state when four or fewer bytes of the packet remain to be transferred. The signals on lines 754 and 756 indicate the offset of the first data transfer of the packet. That is, the signals on lines 754, 756 are both in low logic state if there is no offset; the signal on line 754 is in low logic state and the signal on line 756 is in high logic state, respectively, if there is an offset of one byte; the signal on line 754 is in high logic state and the signal on line 756 is in low logic state, respectively, if there is an offset of two bytes; and, both signals on lines 754, 756 are in a high logic state if there is an offset of three bytes.

The output of gate 670 is generated as the result of a logical AND operation of the logical inversion of the signal on line 750, the signal on line 754, the logical inversion of a "checksum_cnt1" signal on line 758, and a "checksum_cnt0" signal on line 760. The signals on lines 758, 760 are generated by the processor and are used to indicate the number of valid bytes (i.e., containing data from the packet in memory 70) that will be made in the final transfer of data of the packet to the router 12.

The output of gate 672 is generated as a result of a logical AND operation of logical inverses of the signals on lines 750 and 752. The output of gate 674 is generated as the result of a logical AND operation of the signals on lines 750, 752, 754, 756 and the logical inverses of the signals on lines 758, 760.

The signal on line 606 is generated as the result of a logical OR operation, executed by OR logic 682, of the outputs of AND gates 678, 680. The output of gate 678 is generated as the result of a logical AND operation of the logical inversion of the signal on line 750, and the signals on lines 752, 758, and 760. The output of gate 680 is generated as the result of a logical AND operation of the signals on lines 750, 752, 754, 756, 758, and 760.

The signal on line 610 is generated as the result of a logical OR operation, executed by OR logic 690, of the outputs of AND gates 684, 686. The output of gate 684 is generated as the result of a logical AND operation of the signals on lines 752, 758 and the logical inverses of the signals on lines 750, 760. The output of gate 686 is generated as the result of a logical AND operation of the signals on lines 750, 752, 754, 756, 758, and the logical inverse of the signal on line 760.

The signal on line 614 is generated as the result of a logical OR operation, executed by OR logic 696, of the outputs of AND gates 692, 694. The output of gate 682 is generated as the result of a logical AND operation of signals on lines 752, 756 and the logical inverses of the signals on lines 750, 754. The output of gate 694 is generated as the result of a logical AND operation of the signals on lines 750, 752, 754, 756, 760 and the logical inverse of the signal on line 758.

The signal on line 618 is generated as the result of a logical OR operation, executed by OR logic 699, of the outputs of AND gates 698, 700. The output of gate 698 is generated as the result of a logical AND operation of the signals on lines 750, 754 and the logical inverses of the signals on lines 752, 756. The output of gate 700 is generated as the result of a logical AND operation of the signals on lines 750, 752, 754, 758, 760, and the logical inverse of the signal on line 756.

The signal on line 622 is generated as the result of a logical AND operation of the signals on lines 750, 752, 754, 758, and the logical inverses of the signals on lines 756, 760. The signal on line 626 is generated as the result of a logical AND operation of the signals on lines 750, 752, 754, 760, and the logical inverses of the signals on lines 756, 758.

The signal on line 630 is generated as the result of a logical OR operation, executed by OR logic 708, of the outputs of AND gates 706, 710. The output of gate 706 is generated as the result of a logical AND operation of the signals on lines 750, 756, and the logical inverses of the signals on lines 752, 754. The output of gate 710 is generated as the result of a logical AND operation of the signals on lines 750, 752, 756, 758, and the logical inverses of the signals on lines 754, 760.

The signal on line 634 is generated as the result of a logical AND operation of the signals on lines 750, 752, 756, 760, and the logical inverses of the signals on lines 754, 758. The signal on line 638 is generated as the result of a logical OR operation, executed by OR logic 716, of the outputs of AND gates 714, 718. The output of gate 714 is generated as the result of a logical AND operation of the signal on line 750 and the logical inverses of the signals on lines 752, 754, 756. The output of gate 718 is generated as the result of a logical AND operation of the signals on lines 750, 752, 756, and the logical inverses of the signals on lines 754, 756, 758.

The logic implemented by the processor 34 to generate the signal on line 750 is illustrated in FIG. 6C. As shown in FIG. 6C, the signal on line 750 is provided by the non-inverting output of a clocked flip-flop 656 based upon an input signal provided from the output of OR gate 654. The output of gate 654 is the result of a logical OR operation of an initial byte count write signal 804 and the output of an AND gate 652. The signal on line 804 is in a high logic state when the processor 34 stores in a register (not shown) in the adapter 14 a value indicating the total size of the packet (i.e., in bytes) to be checksummed. The output of gate 652 is generated as the result of a logical AND operation of the signal on line 750 and an enable signal on line 802. The logic used by processor 34 to generate the signal on line 752 is shown in FIG. 6D. As shown in FIG. 6D, the non-inverting output of clocked flip-flop 664 provides the signal on line 752, which output is based upon the signal input to flip-flop 664 from the output of OR logic 662. The output of logic 662 is the result of a logical OR operation of the outputs of AND gates 658, 660. The output of gate 658 is generated as the result of a logical AND operation of a "CNT_LESSTHAN9" signal on line 800 and the enable signal on line 802. The output of AND gate 660 is the result of a logical AND operation of the signal on line 752 and the logical inverse of the signal on line 802.

The signal on line 800 is generated by logic implemented by processor 34, which logic is shown in FIG. 6B. As shown in FIG. 6B, the signal on line 800 is provided by the non-inverted output of clocked flip-flop 650, which output is based upon the input provided to flip-flop 650 by the output of comparitor 648. Comparitor 648 receives as inputs the current value contained in the data block size register (i.e., the register written to when the write signal on line 804 is in a high logic state) and the numerical value 9. The checksum control logic 206 is configured to decrement the value contained in this register, after each data transfer from the memory 70, by an amount equal to the number of bytes of the packet transferred via bus 42 as a result of the last preceding read cycle of memory 70. Comparitor 648 is configured to generate a high logic state output signal only when the value contained in the size register is less than 9.

The signal on line 642 is generated as the result of a logical AND operation, executed by AND logic 666, of the logical inverses of the signals on lines 602, 608, 610, 614, 618, 622, 626, 630, 634, and 638.

Flip-flop 646 generates a four-bit output signal, each bit of which signal is used to enable checksumming by logic 76 of a respective data byte of the data word being transferred to the host 12 in the current read cycle of the bus 42. Logic 76 comprises a conventional one's complement checksum generator which is also provided with control signals from the processor 34 via the bus 40, controller 36, and bus 42. These control signals permit, among other things, selective loading of a "seed" (i.e., starting value) into the logic 76. The checksum values output by the logic 76 may be stored in memory locations (not shown) that may be accessed by the processor 34.

In operation of system 10, after a packet to be transferred to the router 12 has been received by the port adapter 14 and stored in memory 70, when the router processor 32 desires that the packet be transferred from memory 70 to memory 30, the processor 32 issues appropriate burst mode read commands for same to controller 28. In response, the controller 28 issues a burst mode read command to controller 36 via PCI bus 26, interface 50 and bus 38. Controller 36 then notifies processor 34 via bus 40 that controller 36 has received a burst mode read request from the router 12 for the packet in memory 70. In response to this notification, processor 34 issues commands to controller 36 via bus 40 to transfer the packet in memory 70 to the router 12 using a burst mode read operation.

In response to this command from the processor 34, controller 36 issues burst mode read commands to the memory system 44 via bus 42 for causing the memory system 44 to transfer to system controller 36 the packet data in memory 70. Memory system 44 then transfers to controller 36 portions of the packet data while simultaneously checksumming these portions of data, using system 200. The portions of packet data received by controller 36 from system 44 are then transferred by controller 36 to controller 28 via PCI bus 38, interface 50, and PCI bus 26. Controller 28 stores received portions of packet data in memory 30 and notifies processor 32 of receipt of such data.

For the reasons discussed previously, since system 10 includes multiple pre-fetched buses 38, 26 and multiple intermediate devices 36, 50, and 28 between memory 30 and memory 44, data latency exists between memory 30 and memory 44 when data is transferred from memory 44 to memory 30. Thus, if the data transfer operation between memory 44 and memory 30 is interrupted (e.g., as a result of processing by the processor 32 of an interrupt service routine that requires access to memory 30 via controller 28 during the transfer of data from memory 44 to memory 30), the address (i.e., in memory 70) of the portion of packet data most recently received by router 12 may differ from that of the portion of packet data most recently provided by memory 44 to controller 36 (and thus, also provided to system 200 for checksumming). Thus, when router 12 recommences transfer of packet data from system 44, the initial memory address specified for transfer in the burst mode read command issued by the controller 28 may specify the next sequential memory address following that of the portion of packet most recently received by controller 28 from adapter 14, not the memory address of the portion of packet data most recently received by controller 36. Thus, since in burst mode read operations, packet data is read from memory 44 starting from the data address initially specified in the burst mode read command issued by controller 28, and data is read out from memory 44 sequentially thereafter (i.e., in sequential address order), if a burst mode read operation of packet data in memory 44 is interrupted and thereafter recommenced by router 12, identical portions of packet data is memory 44 may be repeatedly transferred from memory 44 to controller 36 and presented to system 200 for checksumming.

Advantageously, however, the logic comprised in controller 206 is configured to provide checksum enablement signals to checksum logic 76 that prevent checksum logic 76 from checksumming portions of the data packet that have already been checksummed once by the logic 76. That is, the enable signals provided to logic 76 by controller 206 only enable logic 76 to checksum portions of the data packet that have not yet been checksummed by the logic 76. Thus, controller 206 ensures that an accurate checksum is generated of the total data packet being transmitted from the memory 70 to the memory 30, by ensuring that only portions of the data packet that have not yet undergone checksumming are checksummed by logic 76, despite repeated presentation of identical portions of the data packet to logic 76 as a result of repeated transmission of such identical portions of the data packet to the controller 36.

Once the total checksum of the data block transferred to the host system 12 has been calculated, the processor 34 causes the controller 36 to transfer the total checksum to the router 12, after the last byte of the data block has also been transferred to the host system 12. The system controller 28 of the router 12 then receives the checksum and forwards it to the processor and associated memory 32 and/or stores it in memory 30. The processor 32 may calculate its own checksum of the copy of the data block stored in memory system 30, or memory system 30 may comprise a checksum generator (not shown) for generating a checksum of the copy of the data block. In either case, after the router 12 has generated its own checksum of the copy of the data block in memory 30, the processor 32 compares the checksum it has generated with that supplied by the adapter 14. If the two checksums match, the processor 32 determines that the transfer of the data block was successful, and if they do not match, the processor 32 determines that the transfer was not successful.

Alternatively, if the router is not the final destination of the packet, the router may not verify the packet's checksum, but rather, may forward the packet and checksum to the final destination where such verification may take place.

Thus, it is evident that there has been provided, in accordance with the present invention, a system and method for ensuring accurate checksumming of data to be transferred via at least one bus that fully satisfy the aims and objectives, and achieve the advantages, set forth above. As will be apparent to those skilled in the art, many alternatively, modifications, and variations of the embodiments described above are possible. For example, although the router 12 preferably comprises a 72XX series computer router system commercially available from the Assignee of the instant application, and each of the port adapters 14, 16, 18 preferably comprises a printed circuit card for being connected to the bus 26 of the host system 12 by being inserted into a respective internal bus slot of said system 12, if appropriately modified in ways apparent to those of skill in the art, the router and adapters may comprise other constructions and configurations without departing from the present invention. Also, although the interface 50 is shown in FIG. 3 as being comprised within the port adapter system 14, if system 10 is appropriately modified, interface 50 may alternatively be comprised within the router 12, or further alternatively may be a separate (i.e., standalone) system to which the router 12 and adapter 14 are coupled.

Other modifications are also possible. For example, although the adapters 14, 16, 18 have been described as being for interfacing the router 12 to respective ESCON channels, 20, 22, 24, if appropriately modified, adapters 14, 16, 18 may instead be used to interface the router 12 to other types of communications links. Accordingly, the present invention should be viewed broadly, as being limited only as set forth in the hereinafter appended claims.

What is claimed is:

1. A system for accurately generating a checksum of a data block during transfer of said data block from memory via at least one pre-fetchable bus, said system comprising:

a controller for controlling checksum logic such that only portions of said data block that have yet to be checksummed are checksummed during said transfer, despite repeated presentation of identical portions of said data block to the checksum logic for checksumming during said transfer, the controller being controlled by a processor based upon a starting location of the data block in the memory, a length of the data block in the memory, and a size of a first portion of the data block to be transferred during an initial data transfer operation comprised in said transfer.

2. A system according to claim 1, wherein said at least one bus comprises at least one PCI bus.

3. A system according to claim 1, wherein said block is contained within a computer-readable memory device of a channel port adapter.

4. A system according to claim 3, wherein at least one bus comprises at least a first bus comprised in said adapter, and a second bus for connecting said adapter and a router, each of said first and second buses being pre-fetchable.

5. A system according to claim 4, wherein said transfer of said data is from said memory device to said router via said first and second buses.

6. A method for accurately generating a checksum of a data block as said data block is being transferred via at least one pre-fetchable bus from memory, said method comprising:

controlling checksum logic so as to permit to be checksummed, only portions of the data block that have yet to be checksummed, during transfer from the memory, even if identical portions of the data block are repeatedly transferred via the bus and presented to the checksum logic, the controlling of the checksum logic being based upon a starting location of the block in the memory, a length of the block in the memory, and a size of a first portion of the data block to be transferred during an initial data transfer operation comprised in said transfer.

7. A method according to claim 6, wherein said transfer involves repeated read operations of the same memory location in said block.

8. A method according to claim 6, wherein said at least one pre-fetchable bus comprises at least one PCI bus.

9. A method according to claim 6, wherein said transfer is from said memory to a router via at least two pre-fetchable buses.

* * * * *